3,489,604

SUPERCONDUCTING WIRE

Mark G. Benz, Burnt Hills, and Fred F. Holub, Scotia, N.Y., assignors to General Electric Company, a corporation of New York No Drawing. Filed May 31, 1966, Ser. No. 553,650
Int. Cl. H01b *17/62;* H01f *7/22;* B44d *1/42*
U.S. Cl. 117—218 3 Claims

ABSTRACT OF THE DISCLOSURE

A technique is disclosed for improving the abrasion resistance of electrical insulation of superconductive wire during forming operations such as coiling. The wire is provided with a continuous layer of electrically insulating silica having an overlying layer of alkylmethacrylate. After forming a coil, for example, the resin is depolymerized by heating the coil and the monomer is removed leaving the silica insulating layer intact.

This invention relates to wire for use in constructing superconducting magnets, to magnets constructed of such wire and to process for producing superconductive magnets using the wire of this invention.

The manufacture of electrical windings for electromagnetic coils and the like involves the use of electrically insulated wire. If electrical shorting between turns of the coil is to be avoided, it is necessary that integrity of the insulating coating on the wire be maintained. Where the insulation is comparatively fragile, the problem of completing the mechanical operations necessary to the successful manufacture of these devices with no damage to the insulation is significant.

It is a principal object of this invention to provide an electrically insulated superconductive wire having improved resistance to mechanical damage during handling in the various forming operations.

Another object of this invention is to provide a superconductive coil constructed of the wire of this invention.

An additional object of this invention is to provide an improved process for production of superconductive coils and the like.

Other objects and advantages of this invention will be in part obvious and in part explained by reference to the accompanying specification.

Generally, the wire of this invention comprises a superconductive metal, which may either be elemental or an alloy, which is covered with a continous layer of electrically insulating silica to preclude the flow of electricity between adjoining turns of wire when it is coiled in solenoid form. The superconductive metal may actually be two or more metals present as discrete substances but capable of being later reacted to form a superconductive alloy or compound. The entire wire is coated with an alkylmethacrylate to improve the abrasion resistance of the electrically insulating silica.

It is known that selected metals, either pure or preferably containing minor alloying additions, are capable of being reacted with other metals and forming superconductors of high current-carrying capacity. Specifically, the metals niobium, tantalum, technetium, and vanadium can be reacted or alloyed with tin, aluminum, silicon or gallium to form superconducting compounds or alloys, such as $Nb_3Sn$, which have high current-carrying properties. Additionally, it is currently understood that these alloys or compounds can be improved by first alloying basic metal with a minor amount of solute metal. A complete disclosure and description of various parent metals, solute metals and reactant metals can be found in the copending application of Warren DeSorbo, Ser. No. 237,-

158, filed Nov. 13, 1962, and now abandoned, entitled "Superconducting Materials With High Current-Carrying Capacities and High Critical Field Values," assigned to the same assignee as the present invention and incorporated in the present application by reference.

Of the various materials available, the base metal niobium and the reactant metal tin have been found to form an especially good superconducting compound $Nb_3Sn$. Preferably small amounts of zirconium are included to increase the current-carrying capacity of the alloy.

As was previously mentioned, the present invention is particularly concerned with the protection of the electrically insulating coating used on the conducting portion of the superconducting wire. A particularly good wire is described and claimed in the copending application of Martin and Benz, Ser. No. 467,577, filed June 28, 1965, and now Patent No. 3,429,822, and it is this general type of wire with which this invention deals most directly. As described in the aforementioned application of Martin and Benz, the process for producing superconducting wire such as $Nb_3Sn$ involves coating a niobium base with tin by some suitable process such as vapor deposition or dipping, covering the coated niobium with an electrical insulating material capable of withstanding elevated temperatures and then heating the composite to a temperature of from about 900 to 1000° C. to form the superconducting compound $Nb_3Sn$. It was there found that a continuous layer of electrically insulating silica provided insulation capable of withstanding the reaction temperatures. Specifically, an overap of quartz glass yarn was found to be a particularly good insulating material capable of withstanding elevated temperatures. On the other hand, the silica materials were subject to physical or mechanical abrasion during assembling procedures and often the physical integrity of the continuous layer of insulating material was broken.

We have now found that if the composite wire is coated with an alkylmethacrylate it becomes more resistant to abrasion and flexible enough to allow winding of superconducting solenoids. Specifically, alkylmethacrylates from the group consisting of polymethylmethacrylate, polypropylmethacrylate, polybutylmethacrylate, polyethylmethacrylate and blends of these polymers with each other are particularly effective as coating materials rendering the wire more abrasion resistant. All of these materials depolymerize at the elevated temperature used to react the metallic components of the wire so that the final coil contains none of the original polymer coating. All of these polymers depolymerize cleanly to monomer and relatively inert volatile products and do not produce deleterious side reactions that would reduce the ultimate electrical properties of the coil.

The process by which wire is produced according to this invention comprises providing the coated base wire that will react at elevated temperature to form a superconductive alloy, coating this wire with a continuous layer of electrically insulating silica and then covering the silica insulation with a film of abrasion resistant material which will volatilize at the temperature required to react the metal components forming the superconducting alloy. Once the wire is coated with a suitable polymer, the composite is heated to an elevated temperature to react the metal components and simultaneously depolymerize the abrasion resistant coating. In a specific illustration, tin coated niobium wire was covered with a quartz glass yarn and the yarn in turn coated with polymethylmethacrylate deposited from a suitable solvent and heated to 100–200° to remove the solvent leaving a protective film bonding the composite wire structure. This composite is heated to a temperature of from about 900 to 950° C. for a time suitable to react the niobium tin and depolymerize the polymethylmethacrylate. Although the heating is normally done after the wire is shaped into the form of a coil, it is apparent that the process will work as effectively on straight lengths of wire. Polybutylmethacrylate was also used to coat the composite structure leaving a flexible bonded structure.

Although the present invention has been described in connection with preferred embodiments, it is to be understood that modifications and variations may be resorted to without departing from he spirit and scope of the invention, as those skilled in the art will readily understand. Such modifications and variations are considered to be within the purview and scope of the invention and the appended claims.

What we claim as new and desire to secure by Letters Patent of the United States is:

1. A process for producing wire having improved abrasion resistance enhancing its usefulness in the manufacture of superconducting electromagnetic coils, said process comprising providing a tin-coated niobium wire that will react at elevated temperatures and form the superconductive alloy $Nb_3Sn$, coating the wire with a substantially continuous layer of electrically insulating silica, applying a coating to the composite wire of a film of abrasion resistant material which will volatilize at the elevated temperatures used to react the niobium and tin, the film and its volatile products being substantially inert with respect to the wire, winding the wire to form a coil, and heating the coil to a temperature of from about 900° C. to 950° C., volatilizing the abrasive resistant film and causing the niobium and tin to react and form the alloy $Nb_3Sn$.

2. A process as defined in claim 1 wherein the abrasion resistant material is an alkylmethacrylate selected from the group consisting of polymethylmethacrylate, polypropylmethacrylate, polybutylmethacrylate, polyethylmethacrylate and blends of these polymers with each other.

3. A wire as defined in claim 2 wherein said polymer is polyethylmethacrylate.

References Cited

UNITED STATES PATENTS

| | | | |
|---|---|---|---|
| 3,109,963 | 11/1963 | Geballe | 174—126 XR |
| 3,119,897 | 1/1964 | Coper | 117—231 |
| 3,273,225 | 9/1966 | Saums et al. | 117—231 |
| 3,325,590 | 6/1967 | Westervelt et al. | 117—218 |
| 3,336,549 | 8/1967 | Kafka et al. | 335—216 |
| 3,352,009 | 11/1967 | Cohn et al. | 117—231 |

FOREIGN PATENTS

| | | |
|---|---|---|
| 547,532 | 9/1942 | Great Britain. |
| 998,233 | 7/1965 | Great Britain. |

OTHER REFERENCES

Ottowitz "Wire & Wire Products" vol. 39, No. 3 174–126 March 1964, page 407 relied on.

WILLIAM L. JARVIS, Primary Examiner

U.S. Cl. X.R.

29—599; 117—66; 174—216; 235—216